United States Patent
Kim et al.

(10) Patent No.: US 8,254,395 B2
(45) Date of Patent: *Aug. 28, 2012

(54) COMPUTER-IMPLEMENTED METHOD, SYSTEM, AND PROGRAM PRODUCT FOR TRACKING A LOCATION OF A USER OF A WIRELESS DEVICE IN A PRIVATE NETWORK ENVIRONMENT

(75) Inventors: Jonghae Kim, Fishkill, NY (US); Moon J. Kim, Wappingers Falls, NY (US); Eric C. Yee, Los Angeles, CA (US)

(73) Assignee: International Business Machines Corporation, Armonk, NY (US)

( * ) Notice: Subject to any disclaimer, the term of this patent is extended or adjusted under 35 U.S.C. 154(b) by 721 days.

This patent is subject to a terminal disclaimer.

(21) Appl. No.: 11/266,611

(22) Filed: Nov. 3, 2005

(65) Prior Publication Data

US 2007/0115830 A1   May 24, 2007

(51) Int. Cl.
*H04L 12/28* (2006.01)
*H04W 4/00* (2009.01)

(52) U.S. Cl. ......................... 370/401; 370/328

(58) Field of Classification Search .................. 370/389, 370/392, 395.2, 395.5, 395.54, 328, 338, 370/352, 400, 401; 455/404.2, 456.1, 433, 455/435.1, 450
See application file for complete search history.

(56) References Cited

U.S. PATENT DOCUMENTS

| | | | |
|---|---|---|---|
| 6,295,454 B1 * | 9/2001 | Havinis et al. ............. | 455/456.3 |
| 6,819,258 B1 | 11/2004 | Brown | |
| 6,845,241 B2 | 1/2005 | Edlund et al. | |
| 7,133,909 B2 * | 11/2006 | Bahl ............................. | 709/223 |
| 7,383,043 B2 * | 6/2008 | Lee ................................ | 455/433 |
| 7,457,626 B2 * | 11/2008 | Bahl ............................ | 455/450 |
| 2001/0048744 A1 * | 12/2001 | Kimura ......................... | 380/247 |
| 2004/0203906 A1 | 10/2004 | Kato et al. | |
| 2005/0048990 A1 * | 3/2005 | Lauriol ...................... | 455/456.1 |
| 2005/0118999 A1 | 6/2005 | Zhu | |

(Continued)

FOREIGN PATENT DOCUMENTS

WO   WO 0103372 A1   1/2001

(Continued)

OTHER PUBLICATIONS

Mitchell, U.S. Appl. No. 11/266,508, Office Action Communication, Jul. 24, 2008, 9 pages.

(Continued)

*Primary Examiner* — Michael Thier
*Assistant Examiner* — Feben M Haile
(74) *Attorney, Agent, or Firm* — Hoffman Warnick LLC; William E. Schiesser (57) ABSTRACT

The present invention provides a computer-implemented method, system, and program product for tracking a location of a user of a wireless device in a private network environment. Specifically, under the present invention, a wireless device user will form a data connection with a private network through a public network such as the Internet. At such a time "location" information will be communicated from the wireless device to the provider of the private network, which will use the information to track the location of the wireless device user. In addition, the provider of the private network can query the wireless device when updates to the information are desired. At this or any other time, the wireless device can be queried for any such updates.

17 Claims, 5 Drawing Sheets

U.S. PATENT DOCUMENTS

| | | | |
|---|---|---|---|
| 2005/0136942 A1 | 6/2005 | Timiri et al. | |
| 2005/0232189 A1 | 10/2005 | Loushine | |
| 2006/0018295 A1 | 1/2006 | Choi et al. | |
| 2006/0126556 A1 | 6/2006 | Jiang et al. | |
| 2006/0136124 A1* | 6/2006 | Adamczyk et al. | 701/207 |
| 2006/0136372 A1* | 6/2006 | Schunemann | 707/2 |
| 2006/0221897 A1* | 10/2006 | Nagy et al. | 370/329 |
| 2006/0258371 A1* | 11/2006 | Krishnamurthi et al. | 455/456.1 |
| 2007/0099594 A1* | 5/2007 | Kim et al. | 455/404.2 |
| 2007/0281712 A1 | 12/2007 | Povey et al. | |
| 2007/0287473 A1 | 12/2007 | Dupray | |

FOREIGN PATENT DOCUMENTS

WO    WO 2005088991 A1    9/2005

OTHER PUBLICATIONS

Mitchell, U.S. Appl. No. 11/266,508, Office Action Communication, Jan. 29, 2009, 10 pages.

Mitchell, U.S. Appl. No. 11/266,508, Office Action Communication, Jan. 28, 2008, 12 pages.

Mitchell, U.S. Appl. No. 11/266,508, Office Action Communication, Aug. 6, 2009, 10 pages.

\* cited by examiner

COMPUTER-IMPLEMENTED METHOD, SYSTEM, AND PROGRAM PRODUCT FOR TRACKING A LOCATION OF A USER OF A WIRELESS DEVICE IN A PRIVATE NETWORK ENVIRONMENT

CROSS-REFERENCE TO RELATED APPLICATION

This application is related in some aspects to commonly assigned application Ser. No. 11/266,508, is entitled Computer-Implemented Method, System, and Program Product for Tracking a Location of a User of a Wireless Device in a Public Network Environment, and was filed Nov. 3, 2005, and which is herein incorporated by reference.

FIELD OF THE INVENTION

In general, the present invention relates to location tracking for a wireless device user. Specifically, the present invention provides a computer-implemented method, system, and program product for tracking a location of a user of a wireless device in a private network environment

BACKGROUND OF THE INVENTION

As wireless/mobile devices become more pervasive, the availability of wireless network connections has steadily risen. For example, today, many public places (e.g., parks, shopping malls, coffee shops, etc.) have wireless "hotspots" whereby wireless device users can obtain network connections. This growing trend has allowed many workers to become more mobile and perform their job functions outside of the office. Specifically, workers can utilize the wireless hotspots to form a connection with their private workplace network.

Unfortunately, as convenient as the rise of wireless technology as been, it has become very difficult to track the physical location of mobile workers. At any one time, such workers could be in a variety of locations and/or regions of the world. Existing technology for tracking such individuals relies on Global Positioning System (GPS) technology. Under such technology, each wireless device must be equipped with a GPS tracking device in order to be tracked. There is currently no approach that allows a location of a wireless device user to be tracked in a wireless network environment. In view of the foregoing, there exists a need to overcome the afore-mentioned deficiencies in the existing art.

SUMMARY OF THE INVENTION

In general, the present invention provides a computer-implemented method, system, and program product for tracking a location of a user of a wireless device in a private network environment. Specifically, under the present invention, a wireless device user will form a data connection with a private network through a public network such as the Internet. At such a time "location" information will be communicated from the wireless device to the provider of the private network, which will use the information to track the location of the wireless device user. In addition, the provider of the private network can query the wireless device when updates to the information are desired. At this or any other time, the wireless device can be queried for any such updates.

A first aspect of the present invention provides a computer-implemented method for tracking a location of a user of a wireless device in a private network environment, comprising: establishing a data connection between the wireless device and a private network in response to a connection request; receiving information from the wireless device on a provider of the private network, wherein the information comprises a Media Access Control (MAC) address corresponding to the wireless device; and tracking the location of the user based on the information.

A second aspect of the present invention provides a system for tracking a location of a user of a wireless device in a private network environment, comprising: a system for sending a query to the wireless device from a provider of a private network for information that identifies the location of the user, wherein the information comprises a Media Access Control (MAC) code for the wireless device; a system for receiving the information from the wireless device on the provider of the private network; and a system for tracking the location of the user using the information.

A third aspect of the present invention provides a program product stored on a computer useable medium for tracking a location of a user of a wireless device in a private network environment, the program product comprising program code for causing a computer system to perform the following steps: sending a query to the wireless device from a provider of a private network for information that identifies the location of the user, wherein the information comprises a Media Access Control (MAC) code for the wireless device; receiving the information from the wireless device on the provider of the private network; and tracking the location of the user using the information.

A fourth aspect of the present invention provides method for deploying an application for tracking a location of a user of a wireless device in a private network environment, comprising: providing a computer infrastructure being operable to: send a query to the wireless device from a provider of a private network for information that identifies the location of the user, wherein the information comprises a Media Access Control (MAC) code for the wireless device; receive the information from the wireless device on the provider of the private network; and track the location of the user using the information.

A fifth aspect of the present invention provides computer software embodied in a propagated signal for tracking a location of a user of a wireless device in a private network environment, the program product comprising program code for causing a computer system to perform the following steps: sending a query to the wireless device from a provider of a private network for information that identifies the location of the user, wherein the information comprises a Media Access Control (MAC) code for the wireless device; receiving the information from the wireless device on the provider of the private network; and tracking the location of the user using the information.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

BEST MODE FOR CARRYING OUT THE INVENTION

For convenience purposes, the Best Mode for Carrying Out the Invention will have the following sub-sections:

I. General Description
II. Illustrative Embodiment
III. Computerized Implementation I. General Description As indicated above, the present invention provides a computer-implemented method, system, and program product for tracking a location of a user of a wireless device in a private network environment. Specifically, under the present invention, a wireless device user will form a data connection with a private network through a public network such as the Internet. At such a time "location" information will be communicated from the wireless device to the provider of the private network, which will use the information to track the location of the wireless device user. In addition, the provider of the private network can query the wireless device when updates to the information are desired. At this or any other time, the wireless device can be queried for any such updates.

II. Illustrative Embodiment

Figure 1:
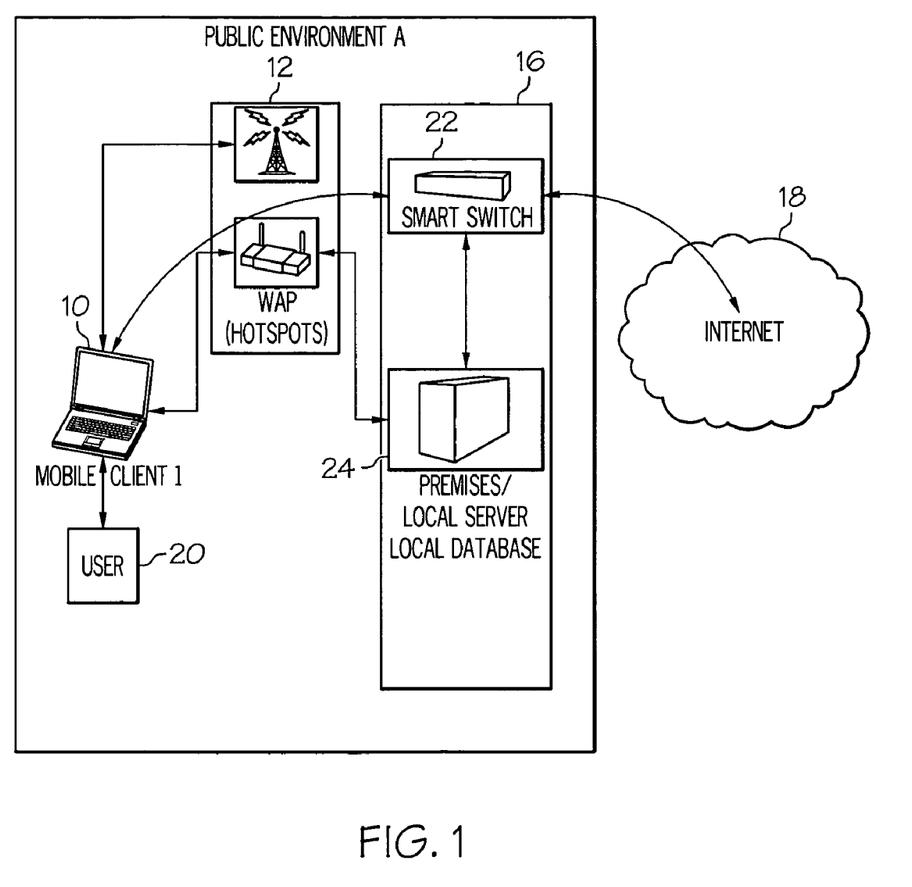
FIG. 1 depicts the authentication of a wireless device user with a wireless connectivity provider according to the present invention.

A typical embodiment of the present invention will now be described in conjunction with FIGS. 1-4. In this embodiment, it is assumed that a wireless device user is attempting to obtain a wireless connection to a private "workplace" network through a public network such as the Internet. It is further assumed that the wireless network user is in a location where wireless access is provided, such as a coffee shop. Referring to FIG. 1, this scenario is shown in greater detail. Specifically, as shown, FIG. 1 depicts a wireless device 10 (mobile client) attempting to first establish a data connection with a public network 18 while located on a particular premises 16. To establish the data connection, a user 20 of wireless device 10 will form an association with a wireless connectivity provider 12 and then be authenticated through standard techniques such as a user name and password. The data connection can then be established with public network 18 through the premises 16.

Figure 2:
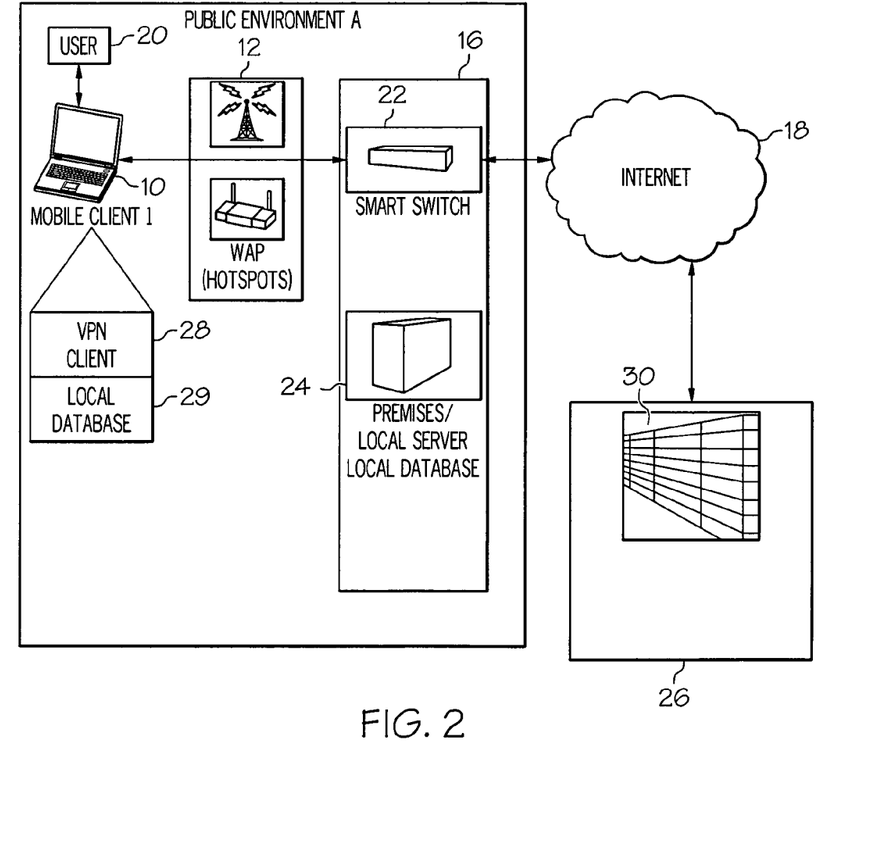
FIG. 2 depicts the creation of a data connection with a private network according to the present invention.

As further shown, premises 16 maintains a switch 22 and a (local) server 24. These resources will be leveraged under the present invention to provide the initial data connection to public network 18. Referring to FIG. 2, the process of the present invention is continued. Specifically, after the data connection with public network 18 has been established, VPN client 28 on wireless device 10 will authenticate with private network 26 and attempt to form a data connection therewith. In a typical embodiment, the data connection is formed by creating a VPN tunnel to private network 26. In any event, as shown, the data connection with private network 26 is formed through wireless connectivity provider 12 and public network 18.

Figure 3:
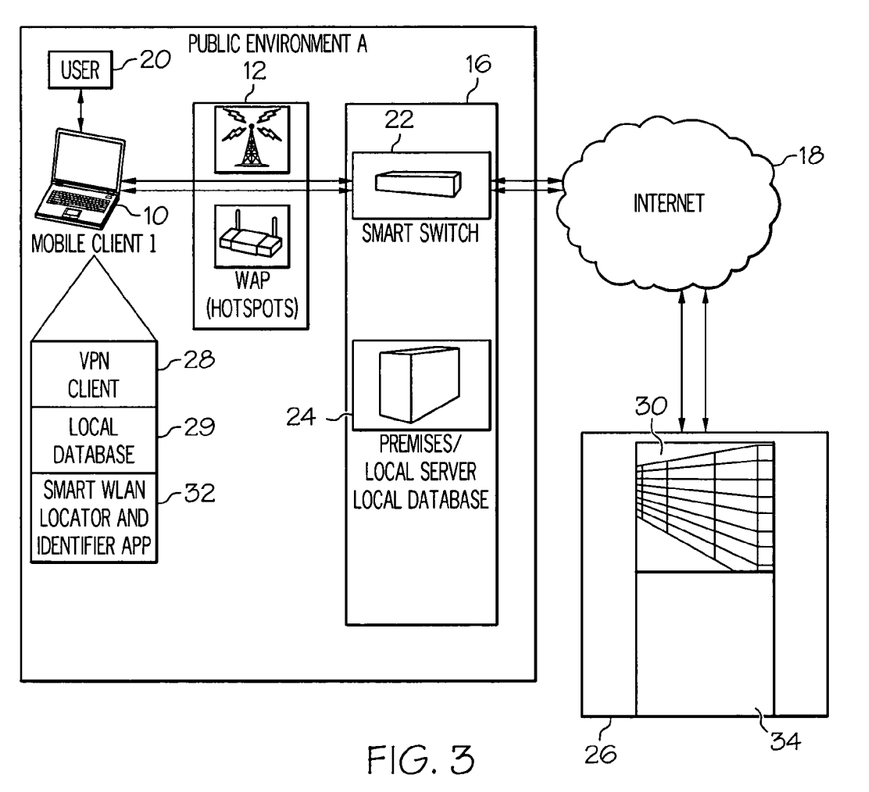
FIG. 3 depicts the tracking of the wireless device user in a private network environment according to the present invention.

Under the present invention, there are occasions when provider of private network 30 may wish to ascertain the precise physical location of user 20. This will be provided under the present invention by cooperative or "counter-part" applications maintained by provider 30 of private network 26 and wireless device 10. Referring to FIG. 3, this is shown in greater detail. Specifically, as shown, wireless device 10 and provider 30 of private network 26 both maintain "counter-part" locator applications. Specifically, wireless device 10 includes device locator application 32, while provider 30 maintains provider locator application 34. It should be understood that although not shown in FIGS. 1-4, provider 30 includes or maintains one or more computer systems that enable its functionality.

Figure 4:
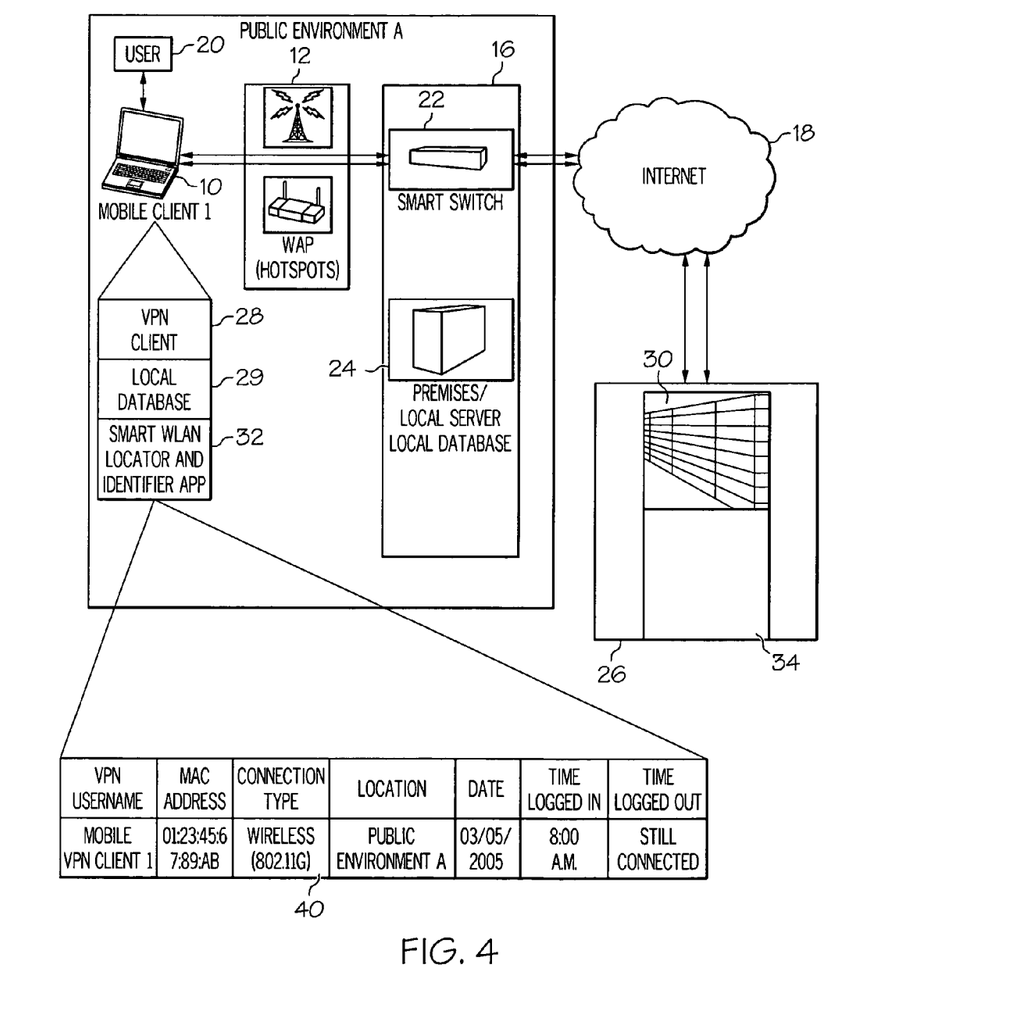
FIG. 4 depicts an information table as used to track the location of the wireless device user according to the present invention.

Regardless, locator applications 32 and 34 will be used to track the location of user 20 based on (a location of) wireless device 10. Specifically, after user 20 is authenticated with provider of wireless connectivity 12, information that identifies a location of user 20 will be stored in local database 29 (and optionally communicated to server 24 for additional storage thereon). "Locator" information under the present invention typically includes: a Media Access Control (MAC) address corresponding to the wireless device 10, a location corresponding to server 24 (e.g., identifying the public environment of premises 16), a timestamp corresponding to the data connection being established between wireless device 10 and private network 26, a name corresponding to wireless device 10, a connection type corresponding to the data connection, and a date corresponding to the date of the data connection. This information typically represents real-time information in that when it is gathered, it represents the most current information for wireless device 10. Moreover, this information is maintained in a table or the like on wireless device 10 and will be managed on wireless device 10 by device locator application 32. Referring to FIG. 4, an illustrative table 40 in which the information is maintained is shown in greater detail.

Referring back to FIG. 3, device locator application 32 will communicate the information to provider 30 (e.g., it will be received by provider locator application 34), which will similarly maintain the information in a table or the like. Provider 30 will use the information to continually track the location of user 20. In addition, under the present invention, the information is updated on wireless device 10 and provider 30 to ensure accuracy. Specifically, provider locator application 34 has the capability to (generate and) send a query (on-demand or on a predetermined schedule) to wireless device 10 for updated information. When wireless device 10 receives such a query, it will communicate updated information to provider 30. Similarly, device locator application 32 has the capability query wireless device 10 for updated information so that the table maintained in local database 29 is certain to be current.

It should be understood that device locator application 32 has the capability to query wireless device 10 or not whether or not it received a query from provider locator application 34. That is, device locator application 32 need not wait for a query from provider locator application 34 to obtain updated information. In any event the information is used to track the physical location of user 20. Moreover, since the information represents real-time information, it can be relied upon for accuracy.

III. Computerized Implementation

Figure 5:
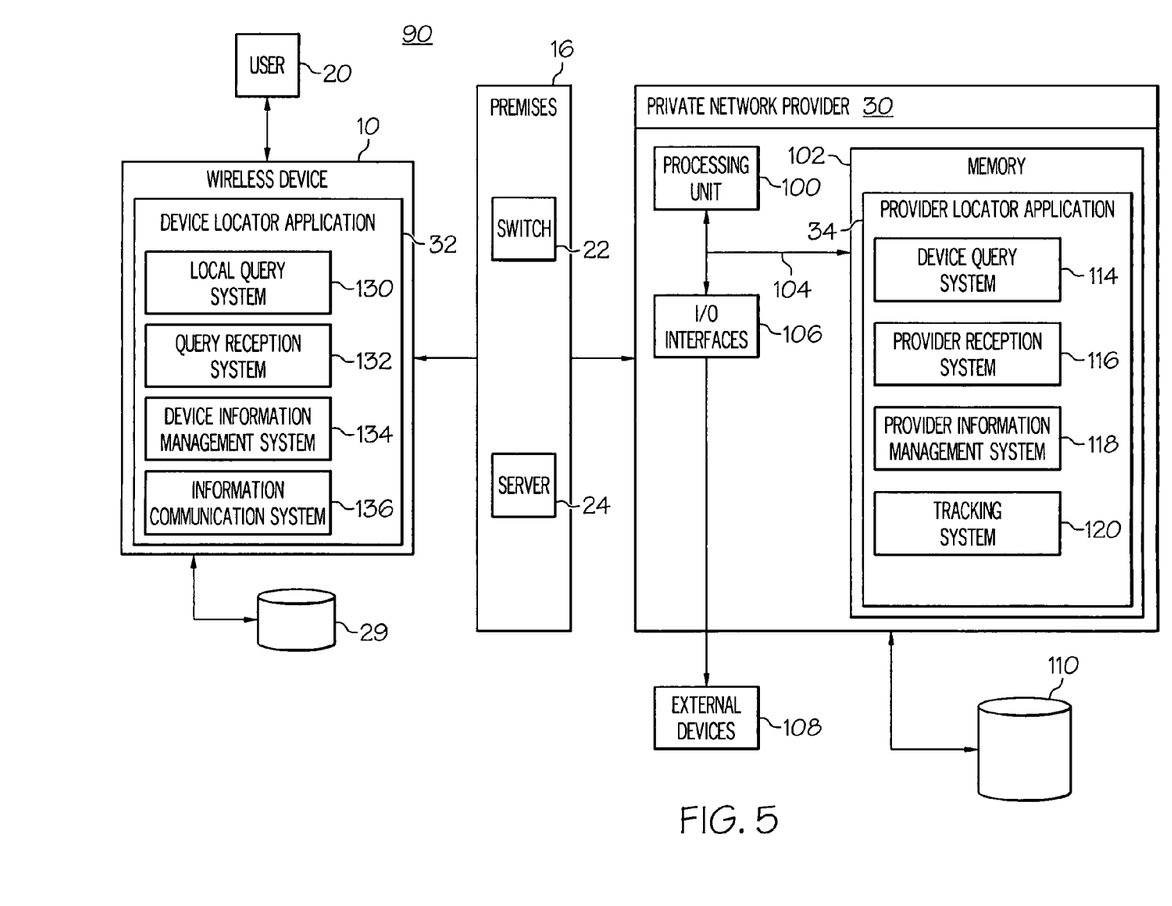
FIG. 5 depicts a more specific computerized implementation according to the present invention.

Referring now to FIG. 5, a more detailed computerized implementation 90 of the present invention is shown. As depicted, implementation 90 depicts wireless device 10, operated by user 20, in communication with premises 16. Further, premises 16 is in communication with wireless network provider 30. It should be understood that some of the components (e.g., public network 18, private network 26, etc.) of FIGS. 1-4 have been omitted from FIG. 5 for brevity purposes only.

In any event, the components of present invention typically communicate via any combination of various types of network-based communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, any of the components of the present invention could be deployed, managed, serviced, etc. by a service provider who offers to track a location of a wireless device user in a private network environment.

As further shown, provider 30 is shown represented by a computer system that includes a processing unit 100, a memory 102, a bus 104, and input/output (I/O) interfaces 106. Further, provider 30 is shown in communication with external I/O devices/resources 108 and storage system 110. In general, processing unit 100 executes computer program code, such as provider locator application 34, which is stored in memory 102 and/or storage system 110. While executing computer program code, processing unit 100 can read and/or write data to/from memory 102, storage system 110, and/or I/O interfaces 106. Bus 104 provides a communication link between each of the components in provider 30. External devices 108 can comprise any devices (e.g., keyboard, pointing device, display, etc.) that enable a user to interact with provider 30 and/or any devices (e.g., network card, modem, etc.) that enable provider 30 to communicate with one or more other computing devices.

FIG. 5 is only representative of various possible computer systems that can include numerous combinations of hardware and/or software. To this extent, in other embodiments, provider 30 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 100 may comprise a single processing unit, or be distributed across one or more processing units in one or more locations, e.g., on a client and server. Similarly, memory 102 and/or storage system 110 can comprise any combination of various types of data storage and/or transmission media that reside at one or more physical locations. Further, I/O interfaces 106 can comprise any system for exchanging information with one or more external devices 108. Still further, it is understood that one or more additional components (e.g., system software, math co-processing unit, etc.) not shown in FIG. 5 can be included in provider 30. However, if provider 30 comprises a handheld device or the like, it is understood that one or more external devices 108 (e.g., a display) and/or storage system 110 could be contained within premises server 24, not externally as shown.

Storage system 110 can be any type of system (e.g., a database) capable of providing storage for information under the present invention such as location information, etc. To this extent, storage system 110 could include one or more storage devices, such as a magnetic disk drive or an optical disk drive. In another embodiment, storage system 110 includes data distributed across, for example, a local area network (LAN), wide area network (WAN) or a storage area network (SAN) (not shown). Although not shown, additional components, such as cache memory, communication systems, system software, etc., may be incorporated into provider. Moreover, it should be understood that although not shown for brevity purposes, wireless device 10, server 24, etc. will include computerized components similar to provider 30.

Shown loaded in wireless device 10 is device locator application 32, which includes a local query system 130, a query reception system 132, a device information management system 134, and an information communication system 136. Similarly, shown in memory 102 of provider 30 is provider locator application 34, which includes device query system 114, provider reception system 116, a provider information management system 118, and a tracking system 120. The applications 32 and 34 collaborate to provide the functions of the present invention as described above. Specifically, assume that user 20 has been authenticated with a wireless connectivity provider. At such a time, local query system 130 will gather the "location" information described above (e.g., MAC address, time stamp, etc.) and store the same in local database 29. When a data connection to a private network (as provided by provider 30) is established, information communication system 136 will communicate the information to provider 30. The information will be received by provider reception system 116 and managed in a table or the like by provider information management system 118

As indicated above, both device locator application 32 and provider locator application 34 have the capability to query for updated information. In the case of the former, local query system 130 of device locator application 32 will query wireless device 10 for an update, which will be used by device information management system 134 to update the table in local database 29. At this time information communication system 136 can automatically communicate the updated information to provider 30 (for receipt by provider reception system 116). In such an instance, provider information management system 118 will update the table of information maintained by provider 30.

Similarly, when provider 30 desires an update, device query system 114 of provider locator application 34 will generate and send a query that will be received by query reception system 132 of device locator application 32. In response, local query system 130 can query wireless device 10 for an update. Whether or not wireless device 10 is queried at that time, the information will be communicated by information communication system 136 to provider 30 (e.g., received by provider reception system 116) and used to update the provider's table by provider information management system 118). At any time, tracking system 120 can access the information in table 40 (FIG. 4) to track the location of user 20.

While shown and described herein as a method, system and program product for tracking a location of a wireless device user in a private network environment, it is understood that the invention further provides various alternative embodiments. For example, in one embodiment, the invention provides a computer-readable/useable medium that includes computer program code to enable a computer infrastructure perform the functions of the present invention. To this extent, the computer-readable/useable medium includes program code that implements each of the various process steps of the invention. It is understood that the terms computer-readable medium or computer useable medium can comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 102 (FIG. 5) and/or storage system 110 (FIG. 5) (e.g., a fixed disk, a read-only memory, a random access memory, a cache memory, etc.).

In another embodiment, the invention provides a business method that performs the process steps of the invention on a subscription, advertising, and/or fee basis. That is, a service provider, such as a Solution Integrator, could offer to track a location of a wireless device user in a private network environment. In this case, the service provider can create, maintain, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for tracking a location of a wireless device user in a private network environment. In this case, a computer infrastructure can be provided and one or more systems for performing the process steps of the invention can be obtained (e.g., created, purchased, used, modified, etc.) and deployed to the computer infrastructure. To this extent, the deployment of a system can comprise one or more of (1) installing program code on a computing device, such as premises server 24 (FIG. 5), from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A computer-implemented method for tracking a physical location of a user of a wireless device in a private network environment, comprising:
   authenticating the user of the wireless device with a private network over a public network, wherein the user uses the wireless device to establish wireless connectivity to the public network using a provider of wireless connectivity;
   establishing a data connection between the wireless device and the private network in response to a connection request;
   storing real-time physical location information on a device locator application; the device locator application maintained on the wireless device;
   receiving the real-time physical location information from the device locator application on a provider locator application, wherein the provider application acts as a counterpart to the device locator application, and the provider locator application is maintained on a provider of the private network, distinct from the provider of the wireless connectivity, wherein the real-time physical location information comprises a Media Access Control (MAC) address corresponding to the wireless device, a location corresponding to a server maintained by the private network, wherein the location identifies a public environment of the physical location of the user, a timestamp corresponding to the data connection between the wireless device and the private network, a name corresponding to the wireless device, a connection type corresponding to the data connection, and a date corresponding to the date of the data connection;
   tracking the precise physical location of the user based on the information;
   updating the real-time physical location information on the device locator application by the device locator application querying the wireless device and receiving updated physical location information;
   querying the wireless device from the provider of the private network; and
   receiving, on the provider locator application, the updated physical location information based on the querying.

2. The computer-implemented method of claim 1, further comprising:
   authenticating the user with the provider of wireless connectivity; and
   establishing a data connection with the public network after the authenticating.

3. The computer-implemented method of claim 1, wherein the establishing comprises forming a Virtual Private Network (VPN) tunnel to the private network.

4. The computer-implemented method of claim 1, further comprising:
   receiving the information on a local server from the wireless device; and
   communicating the information from the local server to the provider of the private network.

5. The computer-implemented method of claim 1, wherein the information is maintained in a table.

6. The computer-implemented method of claim 1, wherein the wireless device comprises a personal computer device.

7. A system for tracking a physical location of a user of a wireless device in a private network environment, comprising:
   an authentication system configured to authenticate the user of the wireless device with the private network over a public network, wherein the user uses the wireless device to establish wireless connectivity to the public network using a provider of wireless connectivity;
   a device locator application for maintaining real-time physical location information; the device locator application maintained on the wireless device;
   a system for sending a query to the device locator application on the wireless device from a provider locator application, wherein the provider application acts as a counterpart to the device locator application, and the provider locator application is maintained on a provider of the private network, distinct from the provider of the wireless connectivity, for the real-time physical location information that identifies the precise physical location of the user, wherein the real-time physical location information comprises a Media Access Control (MAC) code for the wireless device, a location corresponding to a server maintained by the private network, wherein the location identifies a public environment of the physical location of the user, a timestamp corresponding to the data connection between the wireless device and the private network, a name corresponding to the wireless device, a connection type corresponding to the data connection, and a date corresponding to the date of the data connection;

a system for receiving the real-time physical location information from the device locator application on the provider locator application; and a system for tracking the precise physical location of the user using the real-time physical location information.

8. The system of claim 7, further comprising a system for managing the information for the provider of the private network.

9. The system of claim 7, further comprising:
a system for receiving the query on the wireless device from the provider of the private network; and
a system for communicating the information from the wireless device to a provider of a public network.

10. The system of claim 7, wherein the information is maintained in a table.

11. The system of claim 7, wherein the wireless device comprises a personal computer device.

12. A program product stored on a computer useable non-transitory medium for tracking a physical location of a user of a wireless device in a private network environment, the program product comprising program code for causing a computer system to perform the following steps:
authenticating the user of the wireless device with a private network over a public network, wherein the user uses the wireless device to establish wireless connectivity to the public network using a provider of wireless connectivity;
establishing a data connection between the wireless device and the private network in response to a connection request;
storing real-time physical location information on a device locator application; the device locator application maintained on the wireless device;
sending a query to the wireless device from a provider locator application, wherein the provider application acts as a counterpart to the device locator application, and the provider locator application is maintained on a provider of a private network, distinct from the provider of the wireless connectivity, for the real-time physical location information that identifies the location of the user, wherein the real-time physical location information comprises a Media Access Control (MAC) code for the wireless device, a location corresponding to a server maintained by the private network, wherein the location identifies a public environment of the physical location of the user, a timestamp corresponding to the data connection between the wireless device and the private network, a name corresponding to the wireless device, a connection type corresponding to the data connection, and a date corresponding to the date of the data connection;
receiving the real-time physical location information from the device locator application on the provider locator application; and
tracking the precise physical location of the user_using the real-time physical location information;
updating the real-time physical location information on the device locator application by the device locator application querying the wireless device and receiving updated physical location information;
querying the wireless device from the provider locator application; and
communicating, to the provider locator application, the updated physical location information based on the querying.

13. The program product of claim 12, further comprising a system for managing the information for the provider of the private network.

14. The program product of claim 12, further comprising program code for causing the wireless device to perform the following steps:
receiving the query on the wireless device from the provider of the private network; and
communicating the information from the wireless device to a provider of a public network.

15. The program product of claim 12, wherein the information is maintained in a table.

16. The program product of claim 12, wherein the wireless device comprises a personal computer device.

17. A method for deploying an application for tracking a physical location of a user of a wireless device in a private network environment, comprising:
providing a computer infrastructure which when operated:
authenticates the user of the wireless device with a private network over a public network, wherein the user uses the wireless device to establish wireless connectivity to the public network using a provider of wireless connectivity;
establishes a data connection between the wireless device and the private network in response to a connection request;
sends a query to the wireless device from a provider locator application, wherein the provider application acts as a counterpart to the device locator application, and the provider locator application is maintained on a provider of a private network, distinct from the provider of the wireless connectivity, for real-time physical location information that identifies the location of the user, wherein the real-time physical location information comprises a Media Access Control (MAC) code for the wireless device, a location corresponding to a server maintained by the private network, wherein the location identifies a public environment of the physical location of the user, a timestamp corresponding to the data connection between the wireless device and the private network, a name corresponding to the wireless device, a connection type corresponding to the data connection, and a date corresponding to the date of the data connection;
receives the real-time physical location information from a device locator application maintained on the wireless device on the provider locator application; and
tracks the precise physical location of the user using the information.

* * * * *